US012632084B2

(12) United States Patent
Miyamoto et al.

(10) Patent No.: US 12,632,084 B2
(45) Date of Patent: May 19, 2026

(54) ELECTRONIC APPARATUS

(71) Applicant: Lenovo (Singapore) Pte. Ltd.,
Singapore (SG)

(72) Inventors: Tabito Miyamoto, Kanagawa (JP);
Tatsuya Ushioda, Kanagawa (JP);
Yoshiyuki Shibayama, Kanagawa (JP);
Kazuya Umejima, Kanagawa (JP);
Kazuya Tatsuno, Kanagawa (JP)

(73) Assignee: Lenovo (Singapore) Pte. Ltd.,
Singapore (SG)

( * ) Notice: Subject to any disclaimer, the term of this
patent is extended or adjusted under 35
U.S.C. 154(b) by 115 days.

(21) Appl. No.: 18/779,377

(22) Filed: Jul. 22, 2024

(65) Prior Publication Data

US 2025/0068210 A1 Feb. 27, 2025

(30) Foreign Application Priority Data

Aug. 25, 2023 (JP) ................................. 2023-137031

(51) Int. Cl.
G06F 1/16 (2006.01)
(52) U.S. Cl.
CPC .......... G06F 1/1616 (2013.01); G06F 1/1656
(2013.01); G06F 1/1681 (2013.01)
(58) Field of Classification Search
CPC .................................................... G06F 1/1683
USPC .................................................... 361/679.28
See application file for complete search history.

(56) References Cited

U.S. PATENT DOCUMENTS

| 4,959,887 | A | * | 10/1990 | Gruenberg | ............ G06F 1/1681 |
| | | | | | 16/223 |
| 5,177,672 | A | * | 1/1993 | Ito | ........................ G06F 15/0216 |
| | | | | | 439/31 |
| 5,390,075 | A | * | 2/1995 | English | ................. G06F 1/1616 |
| | | | | | 174/136 |
| 5,394,297 | A | * | 2/1995 | Toedter | ................. G06F 1/1681 |
| | | | | | 174/136 |
| 7,253,774 | B2 | * | 8/2007 | Kasamatsu | .......... H01Q 1/1235 |
| | | | | | 343/702 |
| 8,593,800 | B2 | * | 11/2013 | Asakura | ................ G06F 1/1681 |
| | | | | | 361/679.28 |
| 9,480,155 | B2 | * | 10/2016 | Posner | ..................... H05K 1/09 |
| 9,559,449 | B2 | * | 1/2017 | Ishida | .................... H01R 12/77 |
| 9,804,639 | B2 | * | 10/2017 | Posner | ............... G02F 1/13306 |

(Continued)

FOREIGN PATENT DOCUMENTS

| JP | 2020-205034 | A | 12/2020 |
| JP | 2022121092 | A | 8/2022 |
| JP | 7274634 | B1 | 5/2023 |

*Primary Examiner* — Adrian S Wilson
(74) *Attorney, Agent, or Firm* — Osha Bergman Watanabe
& Burton LLP

(57) ABSTRACT

An electronic apparatus includes: a first chassis; a second chassis; a hinge connecting the first chassis and the second chassis at respective connecting edges thereof relatively rotatably; a flat cable provided across the first chassis and the second chassis; a protection film laminated on the flat cable across the first chassis and the second chassis; a drawer body that is coaxial with the hinge and rotates integrally with the second chassis; a tension roller to which an end of the protection film is fixed and that biases the protection film so as to wind the protection film, in the first chassis; and an idle roller that relays to extend a route of the protection film between the drawer body and the tension roller, in the first chassis.

5 Claims, 7 Drawing Sheets

FRONT ◄————► REAR

(56) References Cited

U.S. PATENT DOCUMENTS

| | | | | |
|---|---|---|---|---|
| 10,185,355 B2* | 1/2019 | Watamura | ............. | G06F 1/1637 |
| 10,635,141 B2* | 4/2020 | Silvanto | ................ | G06F 1/1683 |
| 11,656,661 B2* | 5/2023 | Bir | ........................ | G06F 1/1616 |
| | | | | 361/679.28 |
| 11,960,334 B2* | 4/2024 | Silvanto | ................ | G06F 1/1683 |
| 12,112,668 B2* | 10/2024 | Iwai | ....................... | H05K 1/118 |
| 12,222,771 B2* | 2/2025 | Kinoshita | ............... | F16C 11/04 |
| 12,235,689 B2* | 2/2025 | Lin | ....................... | G06F 1/1683 |
| 2004/0264118 A1* | 12/2004 | Karidis | ................ | G06F 1/1683 |
| | | | | 361/679.55 |
| 2013/0058048 A1* | 3/2013 | Choi | ................... | H04M 1/0237 |
| | | | | 361/727 |
| 2015/0049275 A1* | 2/2015 | Posner | ................. | G02F 1/1368 |
| | | | | 361/679.28 |
| 2016/0014915 A1* | 1/2016 | Posner | .................... | H05K 1/09 |
| | | | | 361/679.55 |
| 2016/0327993 A1* | 11/2016 | Garelli | ................. | G06F 1/1681 |
| 2018/0113493 A1* | 4/2018 | Silvanto | ............. | E05D 11/0054 |
| 2020/0401195 A1* | 12/2020 | Bir | ........................ | G06F 1/1637 |
| 2023/0251693 A1* | 8/2023 | Silvanto | ............. | E05D 11/0081 |
| | | | | 361/679.55 |

\* cited by examiner

ELECTRONIC APPARATUS

CROSS-REFERENCE TO RELATED APPLICATIONS

This application claims priority to Japanese Patent Application No. 2023-137031 filed on Aug. 25, 2023, the contents of which are hereby incorporated herein by reference in their entirety.

TECHNICAL FIELD

The present invention relates to an electronic apparatus in which a first chassis and a second chassis are relatively rotatably connected by a hinge.

BACKGROUND

In a laptop personal computer (PC), a main body chassis and a display chassis are relatively rotatably connected by a hinge. Flat cables such as FPCs have excellent flexibility, are bendable, have a high degree of freedom in routing, and are thin, and accordingly are sometimes used in electronic apparatuses including flat chassis, such as laptop PCs. Japanese Unexamined Patent Application Publication No. 2022-121092 discloses connecting two chassis using an FPC. In the technique described in Japanese Unexamined Patent Application Publication No. 2022-121092, given that the route length required of the FPC changes as the rotation angle between the two chassis changes, an S-shaped extra length portion for absorbing such changes is provided in one chassis. In the examples described in Japanese Unexamined Patent Application Publication No. 2022-121092, the S-shaped portion of the flat cable appropriately absorbs changes in route length when the rotation angle between the chassis is in the range of about 0 degrees to 130 degrees.

There is a small gap between the connecting edges of the main body chassis and the display chassis. To prevent the flat cable from being exposed in the gap, covering the flat cable with a protection film is studied. The protection film has a high protective effect when tensioned and pulled.

Some models of laptop PCs rotate from about 0 degrees to 180 degrees. In such models, the S-shape for extra length absorption increases in size. Meanwhile, the tensioned protection film crosses the space linearly. Thus, the space for containing the large S-shape cannot be secured.

SUMMARY

One or more embodiments of the present invention provide an electronic apparatus in which the rotation angle range between a first chassis and a second chassis can be widened and a flat cable can be appropriately protected.

An electronic apparatus according to one or more embodiments of the present invention is an electronic apparatus including: a first chassis; a second chassis; a hinge connecting the first chassis and the second chassis at respective connecting edges thereof relatively rotatably; a flat cable provided across the first chassis and the second chassis; a protection film laminated on the flat cable across the first chassis and the second chassis; a drawer body that is coaxial with the hinge and rotates integrally with the second chassis; a tension roller to which an end of the protection film is fixed and that biases the protection film so as to wind the protection film, in the first chassis; and an idle roller that relays to extend a route of the protection film between the drawer body and the tension roller, in the first chassis, wherein the flat cable abuts a peripheral surface of the drawer body in the second chassis, and is fixed to the second chassis by a fixing portion therebeyond, wherein the protection film sandwiches the flat cable with the drawer body in the second chassis, and is fixed to the second chassis by the fixing portion therebeyond, wherein an extra length space is formed between the protection film folded back by the idle roller and the connecting edge in the first chassis, and wherein the flat cable passes through the extra length space from a gap between the tension roller and the connecting edge in the first chassis and extends to the drawer body through an opening formed in part of the connecting edge, and forms slack in the extra length space depending on a rotation angle between the first chassis and the second chassis.

According to one or more embodiments of the present invention, the rotation angle range between a first chassis and a second chassis can be widened and a flat cable can be appropriately protected.

DETAILED DESCRIPTION

One or more embodiments of an electronic apparatus according to the present invention will be described in detail below, with reference to the drawings. The present invention is not limited by these embodiments.

Figure 1:
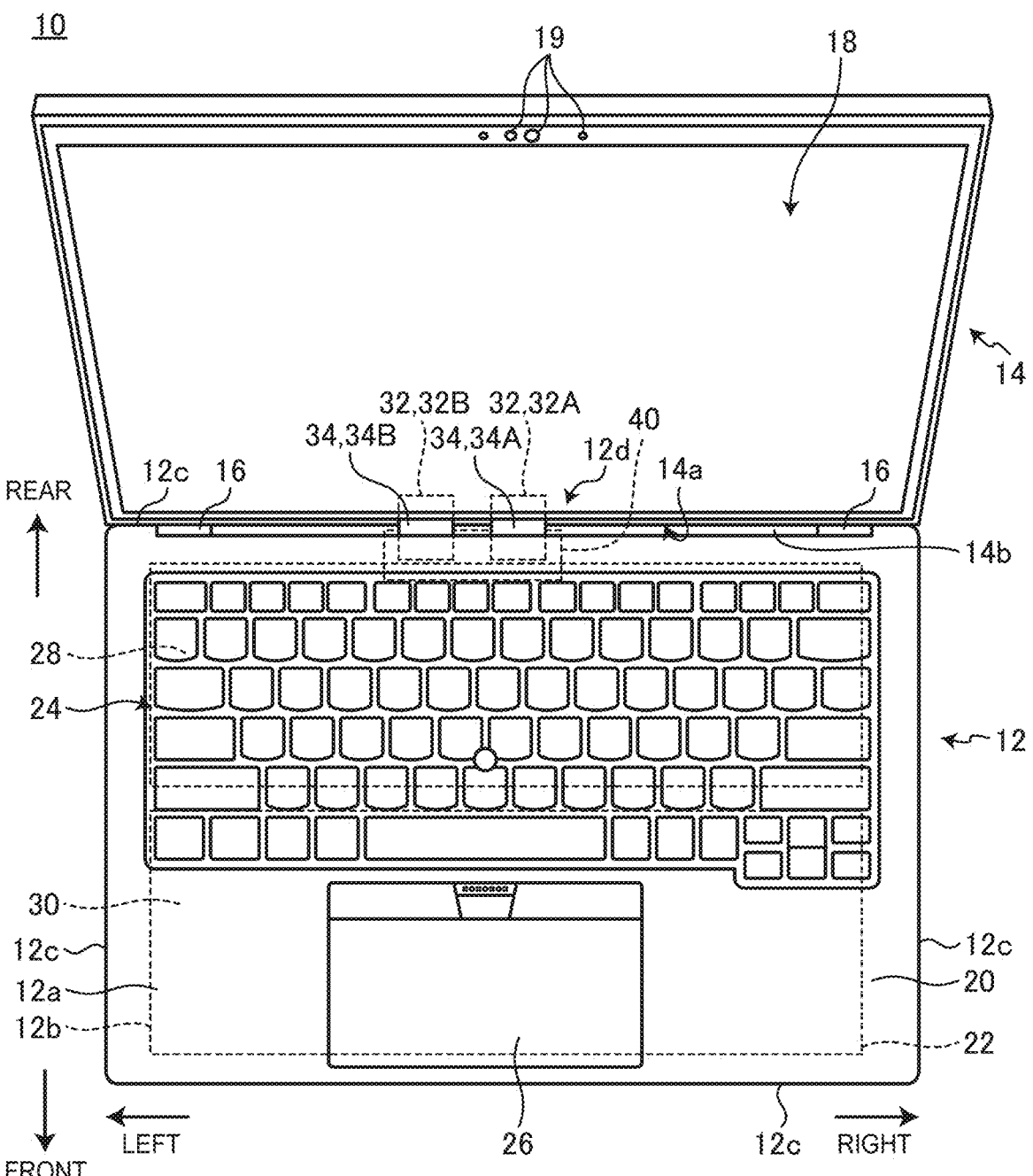
FIG. 1 is a schematic plan view of an electronic apparatus according to one or more embodiments as seen from above.

FIG. 1 is a schematic plan view of an electronic apparatus 10 according to one or more embodiments as seen from above. As illustrated in FIG. 1, the electronic apparatus 10 is a clamshell laptop PC in which a main body chassis (first chassis) 12 and a display chassis (second chassis) 14 are relatively rotatably connected by a pair of hinges 16.

The display chassis 14 is a flat box body thinner than the main body chassis 12. A display 18 is mounted on the display chassis 14. The display 18 is composed of, for example, organic EL (organic light emitting diode (OLED)) or liquid crystal. A plurality of electronic devices 19 are mounted on the upper side of the display chassis 14. The electronic devices 19 include a camera, a microphone, an infrared device, and the like.

The main body chassis 12 and each component mounted in the main body chassis 12 will be described below. Hereafter, based on a posture of viewing the display 18 with the chassis 12 and 14 opened at a predetermined angle as illustrated in FIG. 1, the near side is referred to as "front", the far side as "rear", the width direction as "right-left direction", and the thickness direction as "top-bottom direction".

The main body chassis 12 is a flat box body. The main body chassis 12 is formed in a box shape by a top cover member 20 forming a top surface 12*a* and a bottom cover member 22 forming a bottom surface 12*b* and four peripheral side surfaces 12*c*. The cover members 20 and 22 are overlapped in the thickness direction and removably connected to each other. The bottom cover member 22 at the bottom has a substantially bathtub shape with an open top surface. The top cover member 20 at the top has a substantially flat plate shape and serves as a lid that closes the top opening of the bottom cover member 22. A keyboard 24 and a touch pad 26 are provided on the top surface 12*a* of the main body chassis 12.

The hinge 16 relatively rotatably connects a rear edge portion (connecting edge) 12*d* of the main body chassis 12 and one edge portion 14*a* of the display chassis 14 adjacent to the rear edge portion 12*d*. Suppose the state in which the chassis 12 and 14 are stacked and the clamshell is closed is 0 degrees. Then, the angle range in which the chassis 12 and 14 are rotatable by the hinges 16 in one or more embodiments is 0 degrees to 180 degrees. The rotation angle between the chassis 12 and 14 may be smaller or larger than 180 degrees.

A motherboard 28, a battery device 30, and the like are mounted inside the main body chassis 12. The motherboard 28 is the main board in the electronic apparatus 10. The motherboard 28 is located near the rear of the main body chassis 12. Various electronic components such as a CPU, a GPU, power components, communication modules, memory, and connection terminals are mounted on the motherboard.

The electronic apparatus 10 includes two flat cables 32A and 32B provided across the main body chassis 12 and the display chassis 14. Although the flat cables 32A and 32B are parallel to each other approximately at the center, the flat cables 32A and 32B may be separated to the left and right. The flat cables 32A and 32B are also collectively referred to as "flat cable 32". The number of flat cables 32 may be one, or three or more. The flat cable 32 has one end connected to the motherboard 28 or a subboard in the main body chassis 12, and the other end connected directly or indirectly to the display 18 or the electronic device 19 in the display chassis 14. The flat cable 32 is a flexible printed circuit (FPC). A FPC is formed of a thin sheet or film composed of a polyimide layer, a conductive layer, and the like and has excellent pliability and flexibility. The flat cable 32 may be a flexible flat cable (FFC) or the like.

The electronic apparatus 10 includes protection films 34A and 34B that are laminated on the flat cables 32A and 32B across the main body chassis 12 and the display chassis 14. The protection films 34A and 34B have the same width as or are slightly wider than the flat cables 32A and 32B. The protection films 34A and 34B are also collectively referred to as "protection film 34". The protection film 34 is a sheet-like member excellent in dimensional stability, wear resistance, cut resistance, electric insulation, etc. The protection film 34 is pliable and flexible, but has high rigidity against tensile force. The protection film 34 is thin, and does not generate abnormal noise due to small local bends, buckling, and the like. For example, the protection film 34 is produced by weaving Vectran (registered trademark) which is a liquid crystal polymer made into a thread shape.

A winding mechanism 40 that winds the protection film 34 is provided near the rear edge portion 12*d* inside the main body chassis 12 in the electronic apparatus 10.

Figure 2:
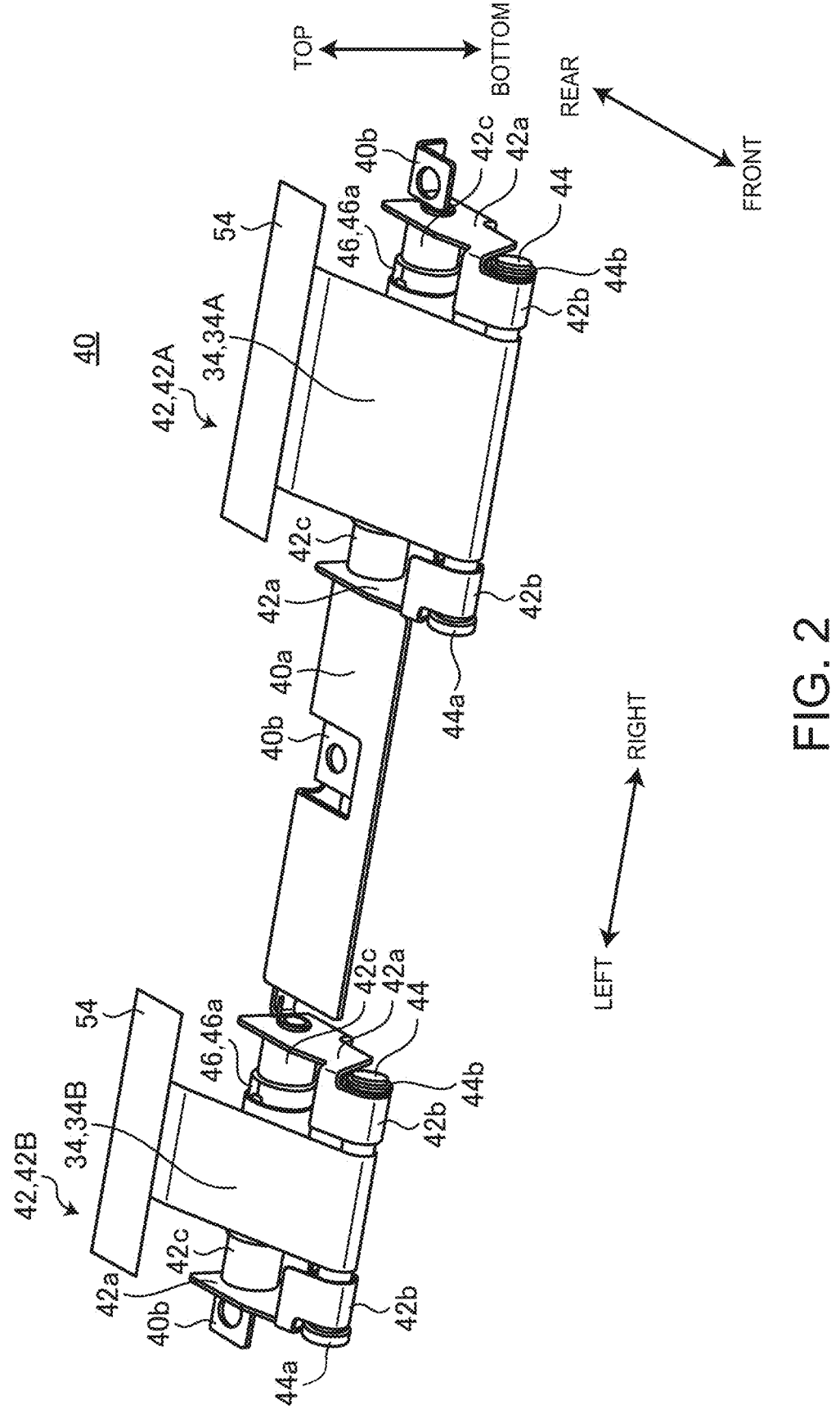
FIG. 2 is a perspective view of a winding mechanism.

FIG. 2 is a perspective view of the winding mechanism 40. The winding mechanism 40 includes a first winding portion 42A on the right, a second winding portion 42B on the left, and a connecting portion 40*a* therebetween. Mounting seats 40*b* are provided at the right and left ends of the winding mechanism 40 and at the connecting portion 40*a*, and are used to fix the winding mechanism 40 to the main body chassis 12 with screws (not illustrated). The connecting portion 40*a* is bent into an L-shape in cross section to ensure strength. The first winding portion 42A on the right and the second winding portion 42B on the left have the same structure except for a certain difference in width, and are also collectively referred to as "winding portion 42".

The winding portion 42 includes right and left side plates 42*a*, and an idle roller 44 and a tension roller 46 supported by the side plates 42*a*. The idle roller 44 and the tension roller 46 each extend in the right-left direction. The idle roller 44 and the tension roller 46 have approximately the same length, and are longer than the protection film 34 to be wound. The idle roller 44 is located forward from and above the tension roller 46. The tension roller 46 has a diameter of about 5 mm, for example. The idle roller 44 has a smaller diameter than the tension roller 46, for example, about ½ of that of the tension roller 46.

The tip of each of the pair of side plates 42*a* is bent toward the opposite side plate 42*a* and further forms a pivotal support curved portion 42*b* rounded so as to form a circular cross section. Both ends of the idle roller 44 are rotatably inserted into the pair of pivotal support curved portions 42*b*. A flange 44*a* is formed at the left end of the idle roller 44 and a ring 44*b* is inserted at the other end of the idle roller 44, in order to prevent the idle roller 44 from coming off.

Figures 3, 4:
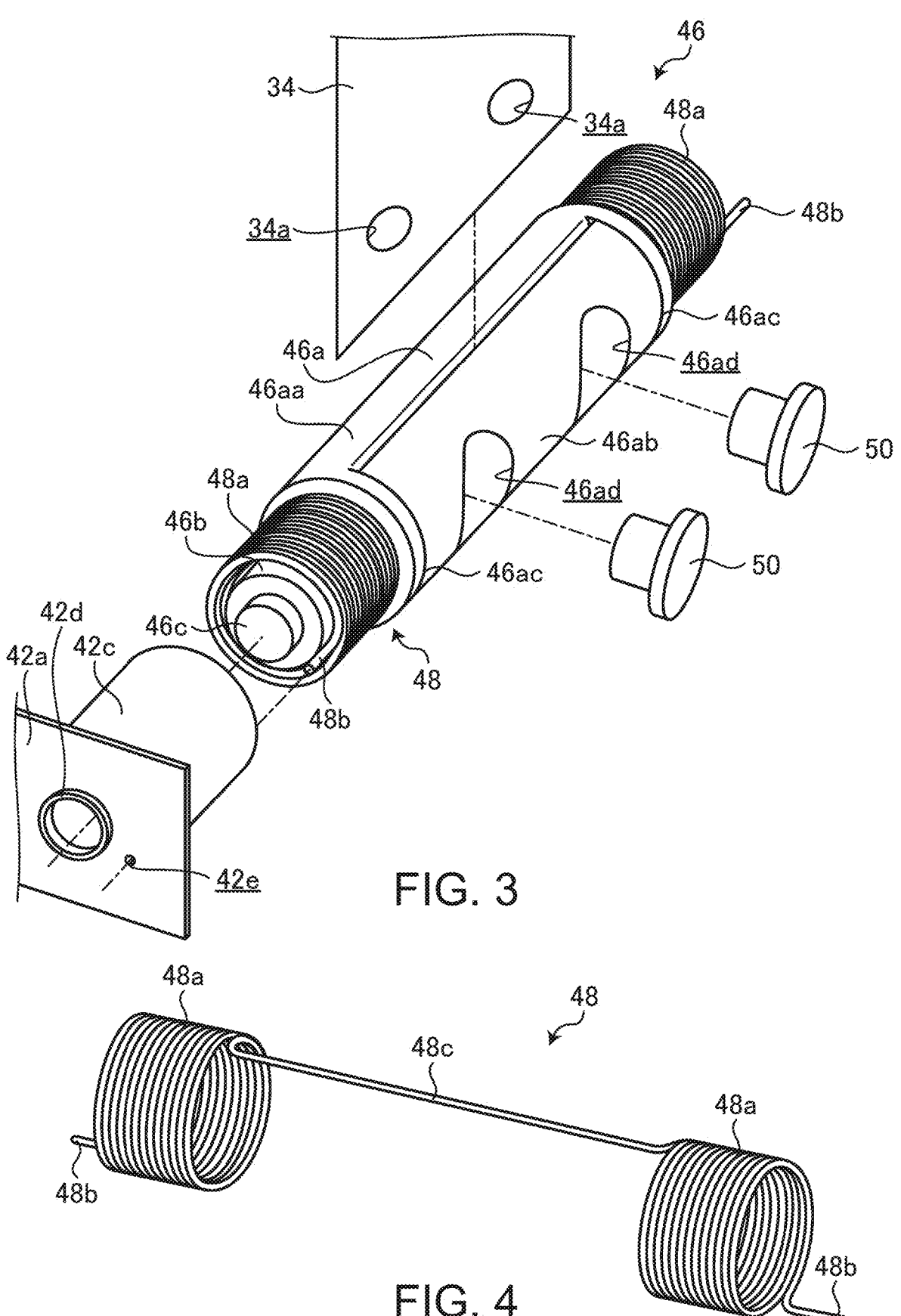
FIG. 3 is a perspective view of a tension roller and part of its surroundings.
FIG. 4 is a perspective view of a torsion spring.

FIG. 3 is a perspective view of the tension roller 46 and part of its surroundings. The tension roller 46 includes a central winding portion 46*a* slightly wider than the protection film 34 in the right-left direction, spring insertion portions 46*b* on both sides of the central winding portion 46*a*, and pivotal support portions 46*c* protruding a little at both ends. The winding portion 46*a*, the spring insertion portions 46*b*, and the pivotal support portions 46*c* all have coaxial cylindrical shapes. The spring insertion portions 46*b* are the portions through which a torsion spring 48 is inserted. The spring insertion portions 46*b* have a smaller diameter than the winding portion 46*a*, and the pivotal support portions 46*c* have a smaller diameter than the spring insertion portions 46*b*.

FIG. 4 is a perspective view of the torsion spring 48. The torsion spring 48 includes a pair of right and left spring portions 48*a*, engagement portions 48*b* protruding at both ends, and a linear connection portion 48*c* connecting the pair of spring portions 48*a*.

Returning to FIG. 3, the spring portion 48*a* and the spring insertion portion 46*b* have approximately the same length, and the engagement portion 48*b* protrudes laterally beyond the spring insertion portion 46*b*. The spring insertion portion 46*b* is appropriately smaller in diameter than the spring portion 48*a*. The side plate 42*a* is provided with a cylindrical cover 42*c* covering the spring portion 48*a*, an annular projection 42*d* supporting the pivotal support portion 46*c*, and an engagement hole 42*e* into which the engagement portion 48*b* is inserted. Although not illustrated, the side surface of the winding portion 46*a* has a groove into which the connection portion 48*c* is fitted.

The winding portion 46a is formed by combining a first half body 46aa and a second half body 46ab each of which is semicircular. The second half body 46ab is interposed between positioning pieces 46ac at both ends of the first half body 46aa. Two screw holes 46ad are formed in the second half body 46ab. Holes 34a are formed in the end of the protection film 34 at the positions corresponding to the screw holes 46ad. The protection film 34 is inserted between the first half body 46aa and the second half body 46ab, and is fixed as a result of screws 50 passing through the screw holes 46ad and the holes 34a and being fitted into internal thread portions formed in the first half body 46aa. With this structure, the tension roller 46 elastically biases the protection film 34 so as to wind the protection film 34. Since the tension roller 46 does not bias the flat cable 32, the flat cable 32 is prevented from defects such as pattern breakage.

Figure 5:
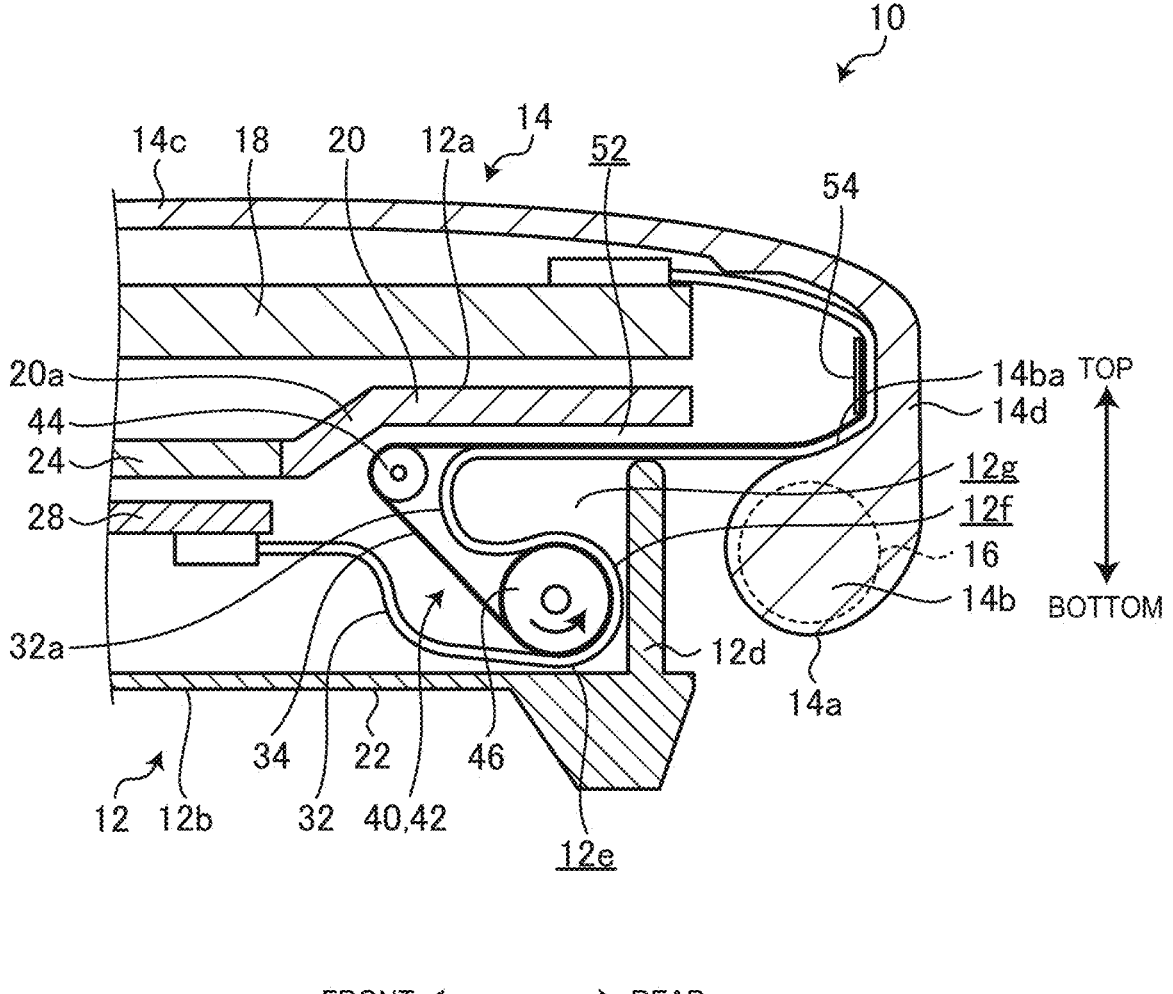
FIG. 5 is a schematic sectional side view of connecting portions of a main body chassis and a display chassis and their vicinity in the electronic apparatus in a state in which the rotation angle between the chassis is 0 degrees.

FIG. 5 is a schematic sectional side view of the connecting portions of the main body chassis 12 and the display chassis 14 and their vicinity in the electronic apparatus 10 in a state in which the rotation angle between the chassis 12 and 14 is 0 degrees.

The main body chassis 12 has an opening 52 that is narrow in the top-bottom direction and through which the flat cable 32 and the protection film 34 pass, between the rear edge portion 12d and the cover member 20. The opening 52 and the idle roller 44 are located near the top end in the thickness direction of the flat shape of the main body chassis 12, and the tension roller 46 is located near the bottom end in the thickness direction of the flat shape of the main body chassis 12.

The tension roller 46 is located near the rear edge portion 12d. A narrow gap 12e is formed between the tension roller 46 and the bottom cover member 22, and a narrow gap 12f is formed between the tension roller 46 and the rear edge portion 12d. The idle roller 44 is located appropriately forward from the tension roller 46. In one or more embodiments, the idle roller 44 is located as forward as possible without abutting a downward inclined portion 20a of the top cover member 20 toward the keyboard 24. The idle roller 44 relays to extend the route of the protection film 34 between the below-described bar 14b and the tension roller 46, in the main body chassis 12. An extra length space 12g is formed between the protection film 34 folded back by the idle roller 44 and the rear edge portion 12d in the main body chassis 12.

In one or more embodiments, the tension roller 46 is elastically biased in the counterclockwise direction as indicated by the arc arrow. The protection film 34 with one end fixed to the tension roller 46 winds around the tension roller 46 in the clockwise direction at a predetermined angle and proceeds obliquely upward, is folded back by the idle roller 44 to be approximately horizontal, and exits the main body chassis 12 through the opening 52. The protection film 34 is in contact with a front diagonal lower part of each of the tension roller 46 and the idle roller 44, i.e. is open-driven on the tension roller 46 and the idle roller 44 (open drive configuration), and the tension roller 46 and the idle roller 44 rotate in the same direction.

The flat cable 32 passes through the extra length space 12g from the gap between the tension roller 46 and the rear edge portion 12d in the main body chassis 12 and extends to a drawer body through the opening 52, and forms slack 32a in the extra length space 12g depending on the rotation angle between the main body chassis 12 and the display chassis 14. The flat cable 32 forms an S-shape on the route from the periphery of the tension roller 46 through the slack 32a to the opening 52. The protection film 34 is laminated on the top surface of the flat cable 32 from the opening 52 to the display chassis 14 to thus protect the flat cable 32. The protection film 34 has no slack because its end is biased by the tension roller 46.

The display chassis 14 includes the bar (drawer body) 14b coaxial with the hinges 16, a back cover 14c covering the back of the display 18, and a side wall (fixing portion) 14d connecting the bar 14b and the back cover 14c. The bar 14b and the rear edge portion 12d are sufficiently close to each other. The bar 14b has approximately the same diameter as the pair of hinges 16, and is located between the pair of hinges 16 so as to appear to be integrated with them (see FIG. 1). The bar 14b is integrated with the display chassis 14, and thus rotates integrally with the display chassis 14. The bar 14b is basically circular in cross section, but has an inclined portion 14ba that smoothly connects to the inside surface of the side wall 14d. In a state in which the rotation angle between the chassis 12 and 14 is 0 degrees, the side wall 14d extends in the top-bottom direction.

The flat cable 32 abuts the peripheral surface of the bar 14b (the inclined portion 14ba in this case) in the display chassis 14, and therebeyond is fixed to the inside surface of the side wall 14d of the display chassis 14 by a fastener 54. The flat cable 32 extends further and is connected to the display 18, etc. The protection film 34 sandwiches the flat cable 32 with the bar 14b in the display chassis 14, and therebeyond is fixed to the inside surface of the side wall 14d of the display chassis 14 by the fastener 54. Thus, both the flat cable 32 and the protection film 34 are fixed to the side wall 14d. The type of the fastener 54 is not limited, and, for example, adhesive tape or adhesive is used.

Figure 6:
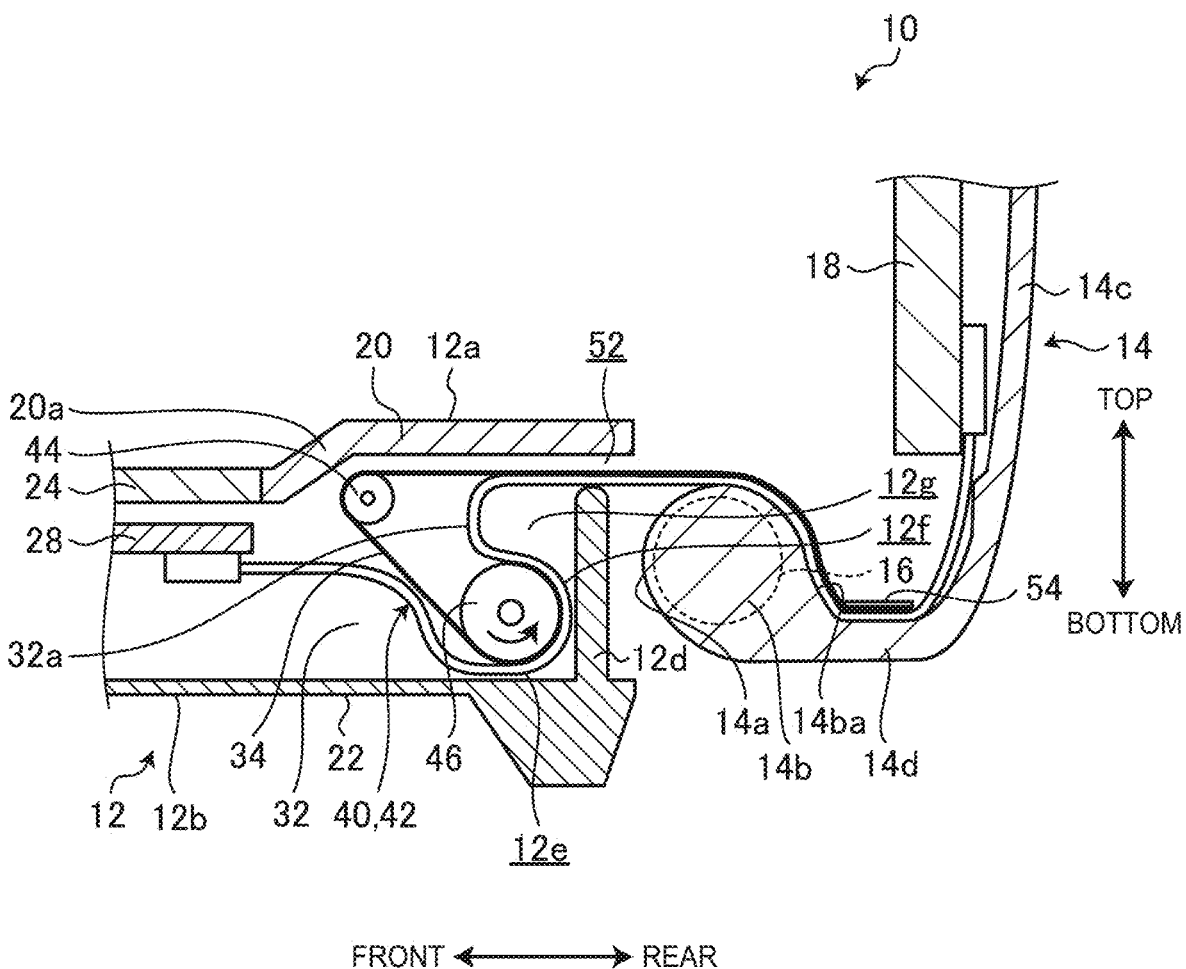
FIG. 6 is a schematic sectional side view of the connecting portions of the main body chassis and the display chassis and their vicinity in the electronic apparatus in a state in which the rotation angle between the chassis is 90 degrees.
Figure 7:
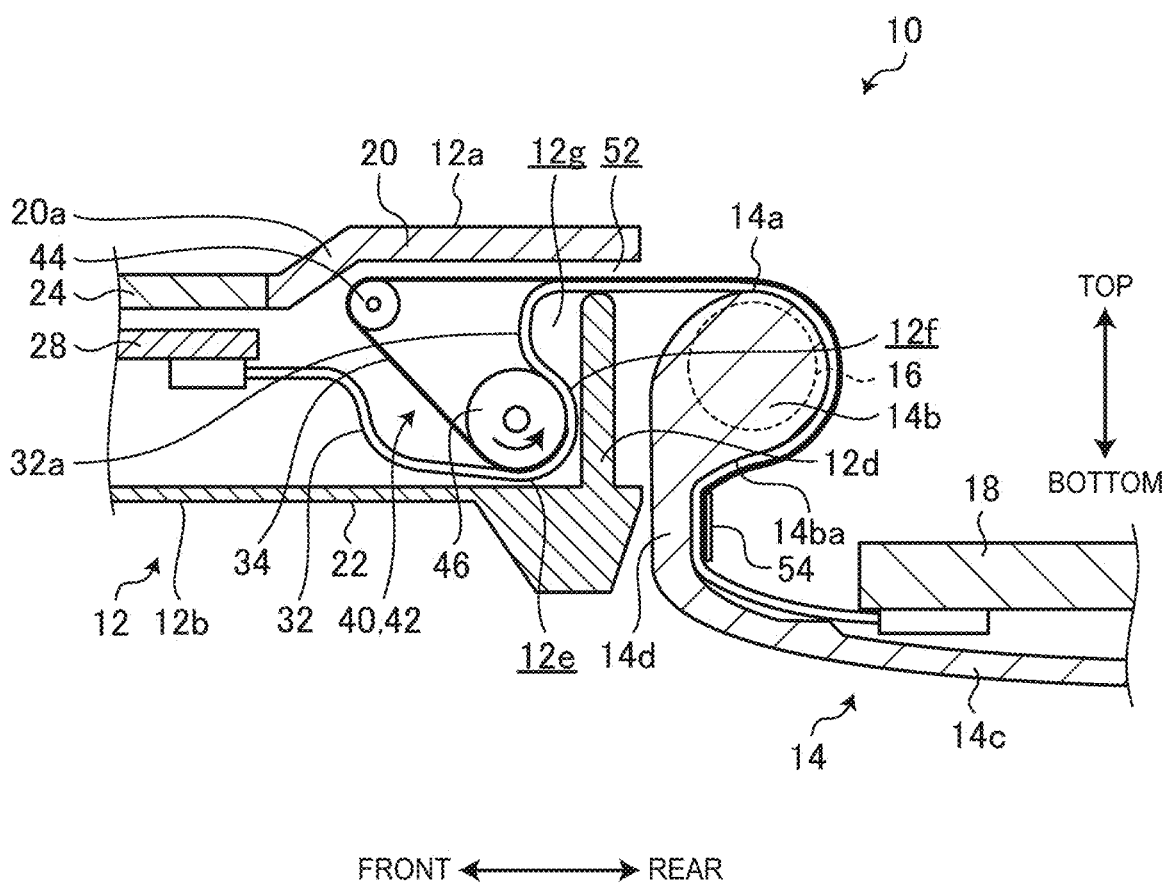
FIG. 7 is a schematic sectional side view of the connecting portions of the main body chassis and the display chassis and their vicinity in the electronic apparatus in a state in which the rotation angle between the chassis is 180 degrees.

FIG. 6 is a schematic sectional side view of the connecting portions of the main body chassis 12 and the display chassis 14 and their vicinity in the electronic apparatus 10 in a state in which the rotation angle between the chassis 12 and 14 is 90 degrees. FIG. 7 is a schematic sectional side view of the connecting portions of the main body chassis 12 and the display chassis 14 and their vicinity in the electronic apparatus 10 in a state in which the rotation angle between the chassis 12 and 14 is 180 degrees.

When the rotation angle between the chassis 12 and 14 changes from 0 degrees (see FIG. 5) to 90 degrees, since the protection film 34 is fixed to the display chassis 14 at the side wall 14d, the protection film 34 is wound on the peripheral surface of the bar 14b and pulled out of the main body chassis 12 by a predetermined length against the elastic biasing force of the tension roller 46 via the idle roller 44. At this time, the idle roller 44 and the tension roller 46 rotate clockwise.

Since the flat cable 32 is also fixed to the display chassis 14 at the side wall 14d, the flat cable 32 is wound on the peripheral surface of the bar 14b together with the protection film 34 and pulled out of the main body chassis 12 by a predetermined length. Here, the slack 32a in the extra length space 12g decreases depending on the pulling amount. The flat cable 32 is wound on the circular arc peripheral surface via the inclined portion 14ba of the bar 14b, and therefore is kept from bending at a sharp angle.

When the rotation angle between the chassis 12 and 14 changes from 90 degrees to 180 degrees, the protection film 34 and the flat cable 32 are further wound by the bar 14b and pulled out of the main body chassis 12, and the slack 32a decreases.

When the rotation angle between the chassis 12 and 14 changes from 180 degrees to 90 degrees and to 0 degrees, the protection film 34 is wound by the tension roller 46 and pulled into the main body chassis 12. Here, the flat cable 32 is pulled into the main body chassis 12 together with the protection film 34 due to the frictional force with the protection film 34 and the pushing force from the bar 14*b*, and the slack 32*a* increases.

In the electronic apparatus 10 having the above-described structure, the tension roller 46 guides the flat cable 32 to appropriately maintain the S-shape, so that changes in route length associated with changes in rotation angle can be appropriately absorbed even in the case where the range of the rotation angle between the main body chassis 12 and the display chassis 14 is wide.

Moreover, the protection film 34 is folded back by the idle roller 44 and the appropriate extra length space 12*g* is formed between the protection film 34 and the rear edge portion 12*d*, so that the formation of the slack 32*a* of the flat cable 32 is not hindered. Since the flat cable 32 is covered with the protection film 34 across the main body chassis 12 and the display chassis 14, the flat cable 32 is protected from contact with the tip of a pen, etc.

The opening 52 and the idle roller 44 are located near the top end of the main body chassis 12, and the protection film 34 is maintained approximately horizontal toward the bar 14*b*. Meanwhile, the tension roller 46 is located near the bottom end. Hence, the wide extra length space 12*g* can be secured. The tension roller 46 has a relatively large diameter to be able to wind a predetermined amount of the protection film 34, whereas the idle roller 44, as it suffices to fold back the protection film 34, has a relatively small diameter to reduce the area occupied by the idle roller 44 in the extra length space 12*g*. Since the protection film 34 is open-driven on the tension roller 46 and the idle roller 44, the extra length space 12*g* can be secured even wider.

Thus, the wide extra length space 12*g* can be secured in the electronic apparatus 10 according to one or more embodiments. Therefore, the relatively large S-shaped part formed by the flat cable 32 can be contained and the rotation angle between the chassis can be set wide. In addition, the protection film 34 is constantly tensioned by the tension roller 46 and thus can appropriately protect the flat cable 32. Furthermore, the protection film 34 makes the flat cable 32 not visible to the user. The flat cable 32 and the protection film 34 are prevented from wear because they do not have parts that slide under high pressure.

Figure 8:
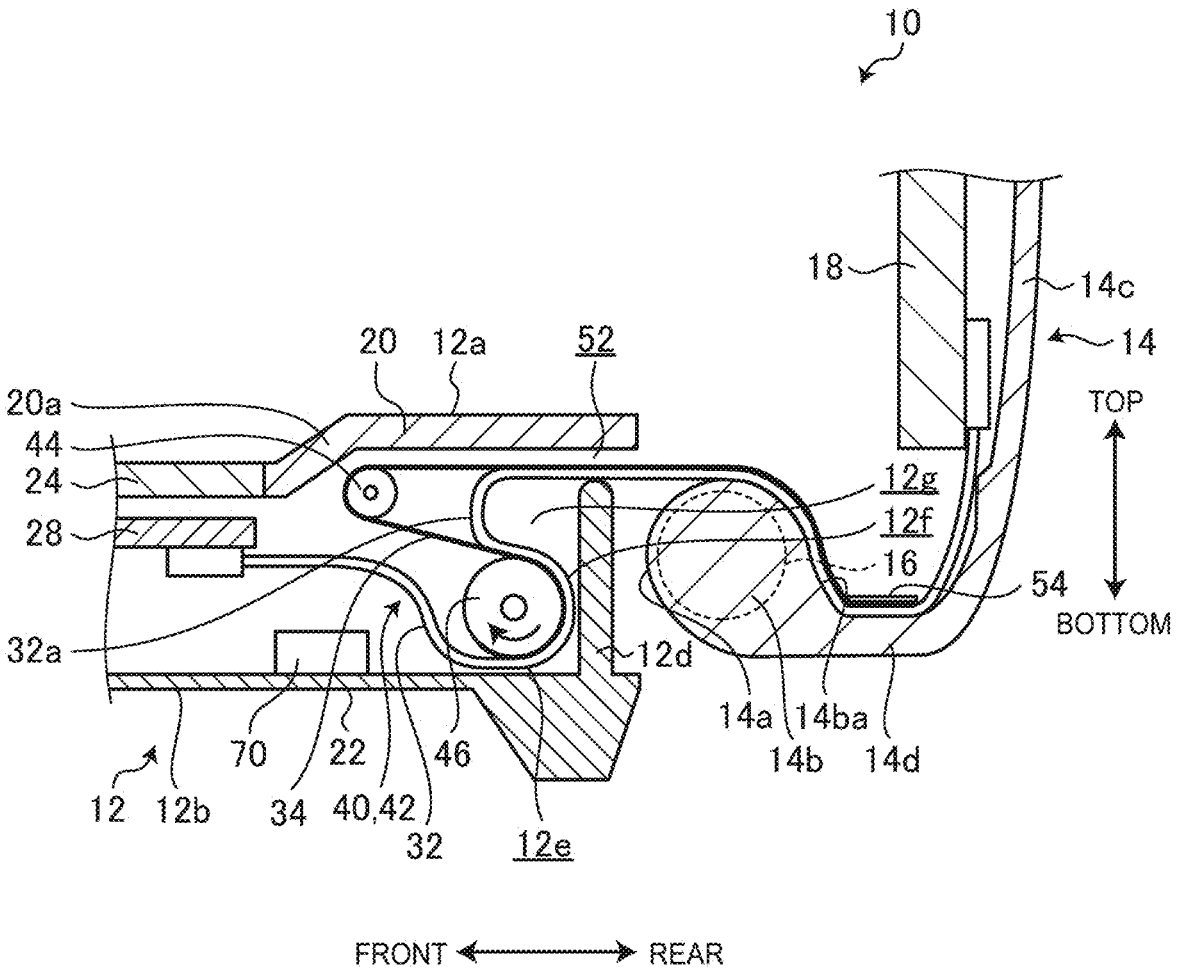
FIG. 8 is a schematic sectional side view of connecting portions of a main body chassis and a display chassis and their vicinity in an electronic apparatus according to a modification.

FIG. 8 is a schematic sectional side view of the connecting portions of the main body chassis 12 and the display chassis 14 and their vicinity in an electronic apparatus according to a modification. In this modification, the protection film 34 is cross-driven from a rear diagonal upper part of the tension roller 46 to a front diagonal lower part of the idle roller 44, and the tension roller 46 and the idle roller 44 rotate in opposite directions. The tension roller 46 is elastically biased in the clockwise direction as indicated by the arc arrow. In this modification, the extra length space 12*g* is slightly narrower, but a space for placing some component 70 is secured on the inside surface of the bottom cover member 22.

The present invention is not limited to the embodiments described above, and changes can be made freely without departing from the gist of the present invention.

DESCRIPTION OF SYMBOLS

10 electronic apparatus
12 main body chassis (first chassis)
12*e*, 12*f* gap
12*g* extra length space

14 display chassis (second chassis)
14*b* bar
14*d* side wall (fixing portion)
16 hinge
32, 32A, 32B flat cable
34, 34A, 34B protection film
40 winding mechanism
44 idle roller
46 tension roller
48 torsion spring
52 opening
54 fastener

What is claimed is:

1. An electronic apparatus comprising:
a first chassis;
a second chassis;
a hinge connecting the first chassis and the second chassis at respective connecting edges thereof relatively rotatably;
a flat cable provided across the first chassis and the second chassis;
a protection film laminated on the flat cable across the first chassis and the second chassis;
a drawer body that is coaxial with the hinge and rotates integrally with the second chassis;
a tension roller to which an end of the protection film is fixed and that biases the protection film so as to wind the protection film, in the first chassis; and
an idle roller that relays to extend a route of the protection film between the drawer body and the tension roller, in the first chassis,
wherein the flat cable abuts a peripheral surface of the drawer body in the second chassis, and is fixed to the second chassis by a fixing portion therebeyond,
wherein the protection film sandwiches the flat cable with the drawer body in the second chassis, and is fixed to the second chassis by the fixing portion therebeyond,
wherein an extra length space is formed between the protection film folded back by the idle roller and the connecting edge in the first chassis, and
wherein the flat cable passes through the extra length space from a gap between the tension roller and the connecting edge in the first chassis and extends to the drawer body through an opening formed in part of the connecting edge, and forms slack in the extra length space depending on a rotation angle between the first chassis and the second chassis.

2. The electronic apparatus according to claim 1, wherein the first chassis has a flat shape,
wherein the opening and the idle roller are located near one end in a thickness direction of the flat shape of the first chassis, and
wherein the tension roller is located near the other end in the thickness direction of the flat shape of the first chassis.

3. The electronic apparatus according to claim 2, wherein the first chassis has a keyboard on a surface at the one end, and
wherein the second chassis has a display.

4. The electronic apparatus according to claim 1, wherein the idle roller is smaller in diameter than the tension roller.

5. The electronic apparatus according to claim 1, wherein the protection film is open-driven on the tension roller and the idle roller.

\* \* \* \* \*